Figure 1:
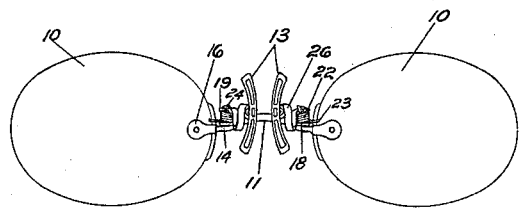

O. Y. LADD.
EYEGLASS MOUNTING.
APPLICATION FILED JULY 24, 1916.

1,236,452.

Patented Aug. 14, 1917.

WITNESS
Chester F. Hayden.

INVENTOR
Osmond Y. Ladd
BY
F. M. Wooster
ATTORNEY

UNITED STATES PATENT OFFICE.

OSMOND Y. LADD, OF DANBURY, CONNECTICUT.

EYEGLASS-MOUNTING.

1,236,452.   Specification of Letters Patent.   Patented Aug. 14, 1917.

Application filed July 24, 1916. Serial No. 110,847.

*To all whom it may concern:*

Be it known that I, OSMOND Y. LADD, a citizen of the United States, residing at Danbury, county of Fairfield, State of Connecticut, have invented an Improvement in Eyeglass-Mounting, of which the following is a specification.

This invention relates to the class of eyeglass mountings in which the nose-pieces are pivoted to carriers, themselves pivoted to the ends of the bridge contiguous to the lens holders, and has for its object to provide a mounting which will be comfortable to wear, will be relatively rigid, in which the center of weight of the lenses will always be below the pivotal point of the nose-pieces, thereby overcoming the tendency of the lenses to swing outward and become detached from the nose, and which will permit any required adjustment of the nose-pieces relatively to the bridge and lenses, *i. e.*, raising or lowering of the lenses, by simply bending the carriers.

This I accomplish in the manner which I will now describe, referring to the accompanying drawing forming a part of this specification and using reference characters to indicate the several parts.

Figure 2:
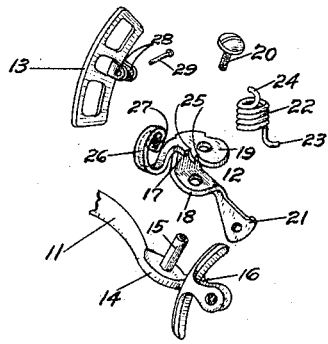
Figure 3:
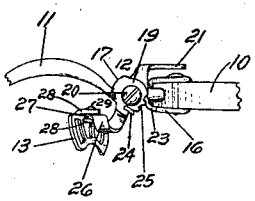

Figure 1 is a rear elevation of a pair of eyeglasses embodying my novel mounting;

Fig. 2 a perspective view on an enlarged scale of the parts coöperating with the right lens, disassembled, and Fig. 3 is a fragmentary plan view on an enlarged scale of the right lens and the corresponding carrier and nose-piece.

10 denotes the lenses, 11 the bridge, 12 the carriers as a whole, and 13 the nose-piece. The carriers and nose-pieces are of course rights and lefts. For convenience, however, I will use the singular form and describe the parts coöperating with the right lens only, as illustrated. At the base of the bridge is a flattened enlargement, indicated by 14, from which a pin 15, internally threaded at its outer end, extends upward. At the outer end of this enlargement is the lens holder 16 which is of ordinary construction. The carrier, which is of entirely novel construction, may be formed from a single piece of sheet metal and comprises a U-shaped body portion 17 which provides a lower bearing flange 18 adapted to rest on the enlargement and an upper bearing flange 19. Both bearing flanges are provided with holes through which the pin passes when assembled. The carrier is retained in place by a screw 20 which engages the threaded hole in the pin but does not bear on the carrier, leaving the latter free to be oscillated on the pin. Extending from the lower bearing flange is a finger-piece 21, which is bent to suitable shape to be gripped by the thumb or finger in removing or adjusting the device as a whole. A coil spring 22 surrounds the pin and is provided with an outwardly extending end 23 adapted to engage either of three notches 25 in the upper bearing flange. In Fig. 3, end 24 is shown in engagement with the inner notch. By moving this end outward to either of the other notches, the tension of the spring and consequently the pressure of the nose-piece on the nose may be increased. The nose-piece is carried by a strap 26 which extends from the upper bearing flange and is curved downward, then upward, and then downward again, resembling a coil. At the free end of this strap is a head 27. The nose-piece is provided with ears 28, shown as formed from the metal of the piece, which are adapted to lie on the opposite sides of the head, the nose-piece being secured in place by a pin 29 which passes through one of the ears and through the head, and is threaded at its end to engage a threaded hole in the other ear, thus leaving the nose-piece free to swing on the carrier and making it self-adjusting to the contour of the nose. It is an important feature of construction that straps 26 extend from the upper bearing flanges, thereby insuring that the center of weight of the lenses will always be below the pivotal point of the nose-pieces to the straps. I thereby wholly overcome the tendency of the lenses to swing outward, which is such a serious objection to many kinds of eyeglasses now upon the market. Should it be required to adjust the height of the lenses relatively to the nose-pieces, no special parts are required, but the desired result may be effected by bending the curved straps to which the nose-pieces are pivoted sufficiently to place the lenses at the exact height required.

The operation is the same as with ordinary eyeglasses of this type. By pressing inward upon the finger-pieces, the operator swings the carriers and nose-pieces outward. When placed upon the nose he releases the finger-pieces, and the nose-pieces, being pivoted to the carriers, adjust themselves to the contour of the nose.

Having thus described my invention, I claim:—

1. In an eyeglass mounting, the combination, with a bridge provided with a lens-holder at each end thereof, of a carrier pivoted between the bridge and each of said lens-holders, said carrier being formed from an integral sheet-metal blank and comprising a U-shaped body portion which provides an upper and a lower bearing flange, a looped strap projecting laterally from the upper bearing flange and carrying at its end a nose-piece, and a finger-piece projecting laterally in the opposite direction from the lower bearing flange.

2. In an eyeglass mounting, the combination, with a bridge having a lens-holder at each end thereof, said bridge being provided with an enlarged and flattened bearing portion between said bridge and each of said lens-holders, and a pivot-pin projecting upwardly from said bearing surface, of a carrier formed from an integral sheet-metal blank and comprising a U-shaped body portion which provides an upper and a lower bearing flange mounted to oscillate on said pins, a coiled strap projecting laterally from the upper bearing flange and carrying at its end a nose-piece, and a finger-piece projecting laterally in the opposite direction from the lower bearing flange.

3. In an eyeglass mounting, the combination, with a bridge having a lens-holder at each end thereof, said bridge being provided with an enlarged and flattened bearing portion between said bridge and each of said lens-holders, and a pivot-pin projecting upwardly from said bearing surface, of a carrier formed from an integral sheet-metal blank and comprising a U-shaped body portion which provides an upper and a lower bearing flange mounted to oscillate on said pins, a coiled strap projecting laterally from the upper bearing flange and carrying at its end a nose-piece, and a finger-piece projecting laterally in the opposite direction from the lower bearing flange, a coil spring mounted on said pin and having ends engaging the lens-holder and one of said flanges, respectively, and means for adjustably varying the tension of said spring.

4. In an eyeglass mounting, the combination, with a bridge provided with a lens-holder at each end thereof, of a carrier pivoted between the bridge and each of said lens-holders, said carrier being formed from an integral sheet-metal blank and comprising a U-shaped body portion which provides an upper and a lower bearing flange, a looped strap projecting laterally from the upper bearing flange and having pivoted at its end a nose-piece, and a finger-piece projecting laterally in the opposite direction from the lower bearing flange.

5. In an eyeglass mounting, the combination, with a bridge having a lens-holder at each end thereof, said bridge being provided with an enlarged and flattened bearing portion between said bridge and each of said lens-holders, and a pivot-pin projecting upwardly from said bearing surface, of a carrier formed from an integral sheet-metal blank and comprising a U-shaped body portion which provides an upper and a lower bearing flange mounted to oscillate on said pins, a coiled strap projecting laterally from the upper bearing flange and having pivoted at its end a nose-piece, and a finger-piece projecting laterally in the opposite direction from the lower bearing flange, a coil spring mounted on said pin and having ends engaging the lens-holder and one of said flanges, respectively, and means for adjustably varying the tension of said spring.

In testimony whereof I affix my signature.

OSMOND Y. LADD.

Copies of this patent may be obtained for five cents each, by addressing the "Commissioner of Patents, Washington, D. C."